US010117260B2

(12) United States Patent
Barailler et al.

(10) Patent No.: US 10,117,260 B2
(45) Date of Patent: Oct. 30, 2018

(54) METHOD AND SYSTEM FOR COMMUNICATING AND SHARING OF INFORMATION FOR AIRCRAFT

(71) Applicant: THALES, Courbevoie (FR)

(72) Inventors: Fany Barailler, Toulouse (FR); Nicolas Rossi, Toulouse (FR); Antoine Lacombe, Toulouse (FR)

(73) Assignee: Thales, Courbevoie (FR)

( * ) Notice: Subject to any disclaimer, the term of this patent is extended or adjusted under 35 U.S.C. 154(b) by 248 days.

(21) Appl. No.: 15/134,135

(22) Filed: Apr. 20, 2016

(65) Prior Publication Data

US 2016/0316481 A1    Oct. 27, 2016

(30) Foreign Application Priority Data

Apr. 21, 2015 (FR) ...................... 15 00836

(51) Int. Cl.
*H04W 72/10* (2009.01)
*H04B 7/185* (2006.01)
*G08G 5/00* (2006.01)

(52) U.S. Cl.
CPC .......... *H04W 72/10* (2013.01); *G08G 5/0013* (2013.01); *G08G 5/0026* (2013.01); *G08G 5/0056* (2013.01); *H04B 7/18506* (2013.01)

(58) Field of Classification Search
CPC ... H04W 72/10; G08G 5/0013; G08G 5/0056; H08G 6/0026
See application file for complete search history.

(56) References Cited

U.S. PATENT DOCUMENTS

| 5,842,142 A | * | 11/1998 | Murray | ................ | G01C 21/00 340/948 |
| 9,483,951 B1 | * | 11/2016 | McCusker | .......... | G08G 5/0091 |
| 2009/0195436 A1 | * | 8/2009 | Ridenour | ............. | G08G 5/0008 342/30 |

FOREIGN PATENT DOCUMENTS

EP          0743580 A1    11/1996

OTHER PUBLICATIONS

Search Report dated Feb. 12, 2016 for French Patent Application No. FR 1500836 filed Apr. 21, 2015.

* cited by examiner

*Primary Examiner* — Siming Liu
(74) *Attorney, Agent, or Firm* — Knobbe, Martens, Olson & Bear, LLP

(57) ABSTRACT

A method and system for communicating and sharing information for an aircraft are disclosed. In one aspect, the method includes identifying a situation from among a set of predetermined situations and obtaining, from a data structure recorded beforehand, a first set of information elements associated with the identified situation. The method also includes determining, from the first set of information elements, and from pieces of information recorded beforehand, a set of pieces of information unavailable in the first system and establishing at least one first request to be sent from the first system to at least one second system. The method further includes sending the at least one first request from the first system to the at least one second system.

19 Claims, 2 Drawing Sheets

METHOD AND SYSTEM FOR COMMUNICATING AND SHARING OF INFORMATION FOR AIRCRAFT

CROSS-REFERENCE TO RELATED APPLICATIONS

This patent application claims the benefit under 35 U.S.C. § 119 of French Application No. FR 15 00836 filed on Apr. 21, 2015 which is hereby incorporated by reference in its entirety.

BACKGROUND

Technological Field

The described technology generally relates to a method for communicating and sharing of information between a first control system onboard an aircraft and at least one second ground control system. The described technology also generally relates to an associated system for communicating and sharing of information.

The described technology is located in the field of aeronautics, and in particular, in the improvement of piloting conditions of an aircraft and for assisting decisions in a piloting system.

Description of the Related Technology

Conventionally, in civil aviation, an aircraft is piloted by a crew, and comprises onboard devices giving the possibility to the crew to communicate with control systems located on the ground, comprising air control systems and systems for communicating information from the airline company on the one hand. The communication capabilities conventionally used comprise vocal communication, allowing the crew, and in particular, the pilot to converse with, for example, an air controller on the one hand, and a capability for communication of digitized data on the other hand.

An aircraft in flight may be found in a nominal situation, in which the operation of all the onboard instruments is nominal and the weather conditions give the possibility of following a pre-established flight plan, or in a degraded situation, which may be a critical situation, in which the pre-established flight plan cannot be followed.

Several such degraded situations may, for example, occur in the case of material degradation of the onboard instrumentation and of degraded weather conditions. In such cases, it can be necessary to carry out a diversion with respect to the pre-established flight plan and to carry out landing at an airport different from the initially intended one. It is clear that in such a situation, the stress and the cognitive burden on the crew are very high. Further, it is primordial to carry out a quick and optimized making of a decision depending on the actual conditions of the encountered situation.

The knowledge of the entirety of the information which gives rise to the possibility of defining a situation is also called "situation awareness" (or being aware of the situation) in aeronautics.

In a degraded situation, it is necessary to collect relevant pieces of information updated from the control systems based on the ground, in order to improve awareness of the current situation and to make a relevant decision.

For example, when a degraded situation requires a diversion, the selection of an airport for an emergency landing can be made on the basis of a multitude of criteria, comprising the weather conditions extracted from weather observation reports (METAR), the condition and the availability of the airport infrastructures, the capacity for receiving passengers, the capacity for repairs, the messages for airmen called Notice to Airmen (NOTAMS) comprising pieces of information published by government agencies for air navigation control.

At the present time, in such degraded or critical situations, the members of the piloting crew are led to communicating with operators of the ground control systems via voice communications via a radio link, or to requesting information and data via aircraft communication addressing and reporting system (ACARS) data links, allowing the input of requests and transmission/reception of digitized data.

It is nevertheless clear that the piloting crew is then under conditions of intense stress, and that the onboard environment may be degraded because of failures or difficult weather conditions, therefore voice exchanges and input of data may prove to be difficult to achieve and time consuming.

Therefore, there exists a need for facilitating the communication of information between onboard the aircraft and the ground, in particular in degraded or critical situations.

SUMMARY OF CERTAIN INVENTIVE ASPECTS

For this objective, the described technology relates to a method for communicating and sharing of information between an onboard system loaded onboard an aircraft and at least one ground control system.

One inventive aspect is a method including the following steps:
  identifying a situation from a set of predetermined situations comprising at least one nominal situation and a critical situation,
  obtaining from a data structure recorded beforehand, associated with the identified situation, a first set of information elements useful for a first system from among the onboard system and a ground control system,
  determining, from the first set of information elements, and from information recorded beforehand, a set of pieces of information unavailable in the first system,
  establishing at least one first request to be sent from the first system to at least a second system, the second system being different from the first system and selected from among the onboard system and a ground control system in order to request pieces of information from the set of pieces of information unavailable in the first system,
  sending the at least one first request from the first system to at least a second system.

Advantageously, the described technology allows fast and automated collection of information, giving the possibility of improving the situation awareness and the making of decisions in the case of a degraded or critical situation, onboard an aircraft or in a ground control system.

The method according to the described technology may also have one or several of the features below, taken independently or according to all the technically acceptable combinations.

The method further includes obtaining from the data structure associated with the identified situation of a second set of information elements useful for the at least one second system, determining pieces of information available in the first system corresponding to the second set of information elements and sending the determined pieces of information to at least one second system.

The method includes a first decision-making step giving the possibility of elaborating in the first system a first decision associated with the situation identified from the pre-recorded pieces of information.

The method further comprises sending from the first system to at least one second system the first decision elaborated in the first system.

The method further comprises receiving a first decision made in the or at least one second system, taking into account the information available in the first system corresponding to the second set of information elements and transmitted to at least one second system.

The first decision made in the or at least one second system further takes into account the first decision elaborated in the first system.

The method comprises receiving one or several communication messages, stemming from at least one second system, containing pieces of information unavailable in the first system required in the first request.

The method includes a second decision-making step giving the possibility of elaborating in the first system a second decision associated with the situation identified from the totality of the information recorded and received in the first system.

The second decision-making step uses the first decision elaborated in the first system.

The first decision-making step and the second decision step apply a multi-criteria selection algorithm.

The method applies validation by a pilot or a controller of the second decision obtained with the second decision-making step and transmission of the second decision obtained with the second decision-making step from the first system to at least one second system.

The method includes receiving at least one second request for information stemming from at least one second system, and sending from the first system to the at least one second system pieces of information required in the second request.

According to an embodiment, the first system and the onboard system is loaded onboard the aircraft.

A second system is a ground air traffic control system.

A second system is a ground operation control system.

According to an embodiment, the first system is a ground control system from among a ground air traffic control system and a ground operation control system, and the second system is the onboard system loaded onboard the aircraft.

According to a second aspect, the described technology relates to a system for communicating and sharing of information between an onboard system loaded onboard an aircraft and at least one ground control system. The system includes capabilities configured to carry out:

identification of a situation from among a set de predetermined situations comprising at least one nominal situation and a critical situation, obtaining from a data structure recorded beforehand, associated with the identified situation, of a first set of information elements useful for a first system from among the onboard system and the ground control system, determining, from the first set of information elements, and of pieces of information recorded beforehand, a set of pieces of information unavailable in the first system, establishing at least one first request to be sent from the first system to at least one second system, the second system being different from the first system and selected from among the onboard system and a ground control system, in order to request pieces of information from the set of pieces of information unavailable in the first system, sending the at least one first request from the first system to at least one second system.

According to an embodiment, the first system is the onboard system loaded onboard the aircraft and the second system is a ground air traffic control system or a ground operation control system.

According to an embodiment, the first system is a ground control system from among a ground air traffic control system and a ground operation control system, and the second system is the onboard system loaded onboard the aircraft.

Some of the advantages of the system according to this embodiment are similar to the advantages of the method according to the embodiment mentioned above.

According to a third aspect, the described technology relates to a computer program comprising program code instructions for executing the steps of the method for communicating and sharing of information between an onboard system loaded onboard an aircraft and at least one ground control system as briefly discussed above.

BRIEF DESCRIPTION OF THE DRAWINGS

Other features and advantages of the described technology will become apparent from description which is given thereof below, as an indication and by no means as a limitation, with reference to the appended figures, wherein.

DETAILED DESCRIPTION OF CERTAIN INVENTIVE EMBODIMENTS

Figure 1:
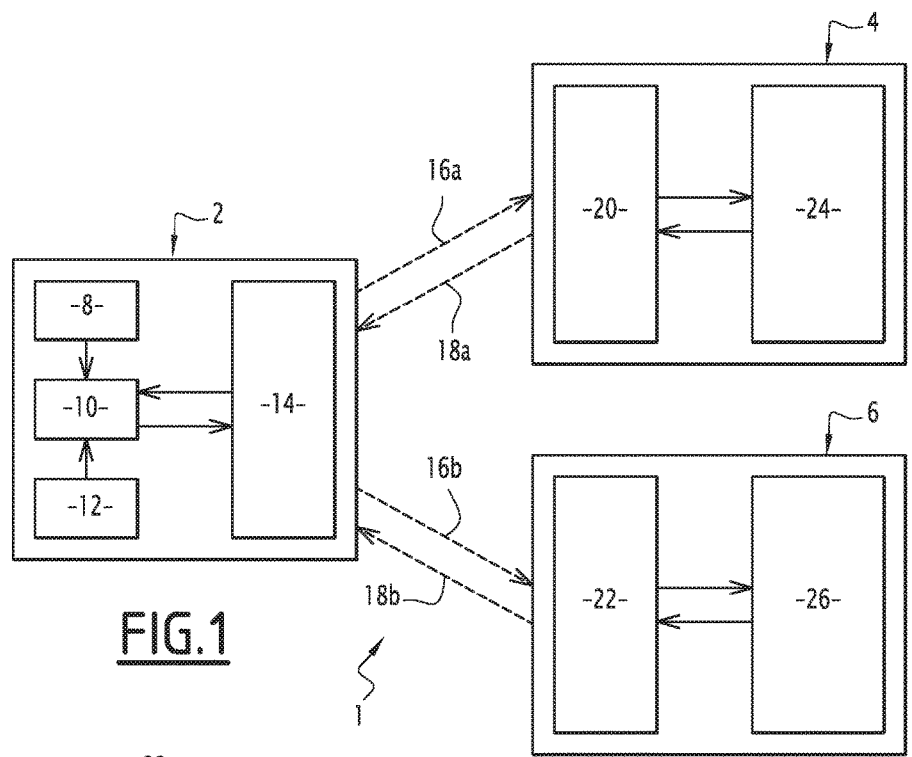
FIG. 1 is a schematic illustration of a system for communicating and sharing of information between a first onboard system and two ground control systems.

FIG. 1 schematically illustrates a system for communicating and sharing of information 1, comprising a first control onboard system 2 and two second systems, which are the control systems 4, 6 located on the ground. It is clear that only two ground control systems have been illustrated in the example, but the described technology applies to a system 1 with any number of ground control systems.

The system 1 is also called a system for communicating onboard/ground pieces of information.

In the example of FIG. 1, the onboard system 2 or first system is loaded onboard an aircraft (not shown) and is controlled and used by members of the piloting crew of the aircraft.

The onboard system 2 is able to communicate with two ground control systems, a second ground control system 4 which is a control system of the control tower type or Air Traffic Control (ATC), which is operated by air controllers and a third ground control system 6 or Aeronautical Operation Control (AOC), which is operated by the airline which charters the aircraft bearing the onboard system 2.

As schematically illustrated in FIG. 1, the onboard system 2 comprises a display capability or display 8, for example, monitoring screens, a capability 12 for interacting with the members of the piloting crew, such as input and/or output devices, and one or several computing devices 10, for example, flight computers or calculators, comprising processors able to apply program code instructions for producing diverse functional modules capable of applying the described technology. Each computing device 10 comprises a capability for storing in memory and storing data. Further, each computing device 10 is capable of recovering any datum provided by the different onboard systems, for example, via one or several interfaces.

The onboard system 2 also comprises communication capability 14, able to produce a function for digital communication of digitized data, via wireless communications, between the aircraft and the ground communication capability.

The communication capability 14 comprises a transmission capability and a capability for receiving digitized data, via radio, in the form of messages 16a, 16b, 18a, 18b formatted according to a predefined communication format, called communication messages.

In an embodiment, the messages 16a, 18a exchanged between the onboard system 2 and the air traffic control system 4 are compliant with a standardized exchange protocol.

Three sub-categories of exchanges are distinguished: exchanges of the text type between pilot and air controller, automated exchanges between onboard and ground systems, exchanges of flight context data.

The exchanges of the text type between pilot and air controller are exchanges of the Controller Pilot Data Link Communications (CPDLC) type. All the possible messages are predefined in order to ensure specific and unambiguous dialogues. There also exists an option allowing definition of "free text" messages. For example, the onboard device proposes to the pilot, via the interaction capability 12, "free text" messages, and the pilot is led to validating them before sending them.

The automated exchanges between onboard the aircraft and the ground are defined by the Automatic Dependent Surveillance-Contract (ADS-C) protocol. The onboard system 2 and the ground system 4 first negotiate the conditions according to which the ADS-C transmissions are carried out: periodical, upon an event, on demand from the ground control system, or in an emergency on demand from the pilot.

The pieces of information transmitted to the ATC control system include: the position of the airplane, the intended route, the speed of the airplane (on the ground or in the air), weather data.

Optional data, depending on the situation $S_i$, will be added in the exchange periodic reports.

The exchanges of flight context data are of the Digital Automatic Terminal Information Service (D-ATIS) type. The D-ATIS messages comprise information like weather data on the ground, the operating runway(s), the available approach and any piece of information required for the pilots. A single message may be transmitted to the aircraft having transmitted a request, but a subscription mechanism is possible, and a message is sent during each update. The onboard control system uses D-ATIS messages for sending requests and receiving from the ground the ATIS data relating to the airports.

In an embodiment, the messages 16b, 18b exchanged between the onboard system 2 and the Aeronautical Operation Control (AOC) operational control system 6, which is operated by the airline which charters air traffic, are in the free exchange format, according to semantics defined by a grammar known to both systems 2 and 6. For example, the Abstract Syntax System One (ASN.1) syntax which is an international standard specifying a notation intended to describe data structures in the sector of telecommunications and computer networks, is used. The ASN.1 description of a data structure has the purpose of obtaining a specification of the structure without any ambiguity and independently of particular coding.

Each of the ground control systems 4, 6 comprises a wireless communication capability 20, 22, able to receive digitized data as messages 16a, 16b from the transmission capability of the communication capability 14 and of sending digitized data as messages 18a, 18b in return.

The communication capability 20 is able to communicate with one or several computing devices 24, for example one or several computers, comprising processors able to apply program code instructions for producing diverse functional modules able to apply the described technology, and a capability or interface for interacting with an operator.

Also, the communication capability 22 is able to communicate with one or several computing devices 26, for example one or several computers, comprising processors able to apply the program code instructions for producing diverse functional modules able to apply the described technology, and a capability or interface for interacting with an operator.

Figure 2:
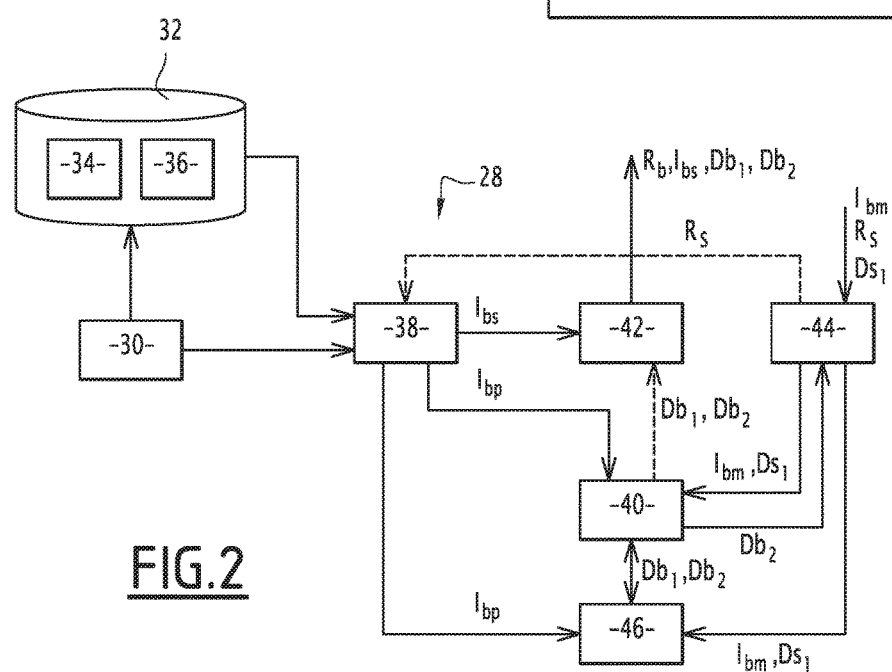
FIG. 2 is a block diagram of the main modules of an onboard system according to the described technology.

In an embodiment of the described technology illustrated in FIG. 2, an onboard system 28, implemented in the onboard system 2, comprises a module 30 for detecting a current situation of the aircraft, from among a set of predefined situations.

Each situation has a cause, for example a failure (e.g. engine failure, de-pressurization) or other failure (e.g. fire onboard, medical problem, or a ground problem, for example, an airport closed for snow), and a set of associated consequences, for example, the requirement of a diversion of the initial flight plan or the requirement of immediate landing.

The identification of the current situation may be carried out automatically by the onboard system, for example, in the case of detection of an engine failure or of de-pressurization.

Alternatively, a pilot may perform the identification of a situation, for example, by selecting a situation from a list via a scrolling menu. According to an embodiment, the pilot selects a critical situation from a menu, subsequent to having received a piece of information, for example, by audio communication with a ground system.

According to another alternative, or as an addition to the previous alternatives, the pilot has a single capability, for example, a button, for triggering a critical situation condition.

Alternatively, or additionally, as explained subsequently, the method for communicating and sharing of information is applied by one or several ground control systems.

The types of situations are predefined and identified with given identifiers.

For example, the set of situations noted as $S_1$, $S_2$ to $S_n$, comprises a nominal situation $S_1$ and a plurality of degraded or critical situations $S_2$ to $S_n$, corresponding to diverse criticality levels.

The module 30 for detecting the current situation is either able to automatically detect a degraded or critical situation, for example, according to a detection of failure by a piece of onboard equipment or alternatively, by receiving a degraded situation reported by a ground system, or to receive a selection of a situation identifier provided by a member of the piloting crew.

The onboard system comprises a unit 32 for storing in memory, which stores in memory the data structure 34 comprising, for each predefined flight situation, pieces of information to be inputted in order to obtain a complete analysis of the situation ("situation awareness"). Further, the unit for storing in memory 32 is able to store in memory information 36, recorded/available onboard, relating to the current situation of the aircraft. This is the set of pieces of information available onboard, comprising data recorded beforehand and real time data.

These pieces of information 36, for example, comprise weather conditions in proximity to the airplane, the type and the series number of the airplane, the flight number, the number of persons onboard, the remaining amount of fuel.

Figure 3:
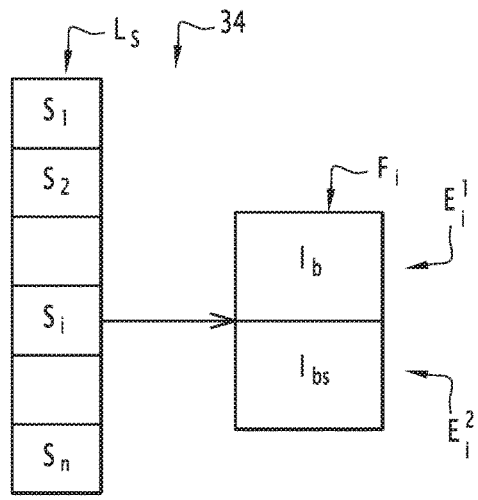
FIG. 3 is a schematic example of sets of pieces of information listed according to identified situations.

FIG. 3 schematically illustrates a structure of pieces of information 34, according to an embodiment, comprising in this example a list Ls of identifiers of situations $S_1$, $S_2$, ..., $S_n$, and for each situation $S_i$ identified in the list, a record of information elements Fi.

A record of information elements Fi refers to the whole of the pieces of information to be recovered or inputted for totally describing the identified situation $S_i$ and to allow adequate decision-making.

According to an embodiment, the record of information elements Fi comprises a first set $E_i^1$ listing information elements $I_b$ useful for the onboard system in the situation $S_i$, and a second set $E_i^2$ listing information elements $I_{bs}$ useful for the ground control system(s) in the situation $S_i$.

Subsequently to the detection of a situation $S_i$, the situation identifier is transmitted to a module 38 for recovering and analyzing useful information recorded onboard for the situation $S_i$. The module 38 is able to recover the record of information elements Fi corresponding to the identified situation $S_i$, and the pieces of information 36, comprising the recorded pieces of information and the available real time data, and to determine:

- a first sub-set of onboard information elements, belonging to the first set $E_i^1$ of information elements useful onboard, for which the recorded pieces of information $I_{bm}$ onboard are missing or obsolete;
- a second sub-set of ground information elements, belonging to the second set $E_i^2$ of information elements useful for the ground control system(s), for which the recorded pieces of information onboard $I_{bs}$ are updated;
- a third sub-set of information elements onboard, belonging to the first set $E_i^1$ of information elements useful for the onboard system, for which the information $I_{bp}$ recorded onboard are updated.

It should be noted that certain pieces of information, for example, the pieces of information relating to local weather conditions for landing, should be refreshed at a given time frequency, otherwise they are obsolete. The refreshing time frequency is a parameter to be defined depending on the identified situation $S_i$.

The information recorded onboard, corresponding to the third sub-set of onboard information elements, are sent to a decision-making module 40 capable of elaborating a first decision $Db_1$ on the basis of information $I_{bp}$ available onboard, for the situation $S_i$. The decision-making module 40 is either capable of elaborating automatically a decision on the basis of information $I_{bp}$ relating to the situation $S_i$ recorded onboard, or by obtaining a decision selected by a pilot on the basis of a display of pieces of information $I_{bp}$ relating to the situation $S_i$ recorded onboard.

For example, if the situation $S_i$ is a situation requiring a diversion with emergency landing, the first decision $Db_1$ can consist of determining an airport for an emergency landing, selected from a set of selectable close airports.

According to an embodiment, the automatic elaboration of the first decision is carried out by implementing a multi-criteria selection algorithm, according to one of the embodiments described in more detail hereafter.

The first and second sub-sets of determined information elements, as well as the first decision are sent to a module 42 for sending requests and information to the ground control systems.

This module 42 is capable of sending a request Rb requesting pieces of information $I_{bm}$ corresponding to the first determined sub-set of information elements, and the pieces of information $I_{bs}$ corresponding to the second sub-set of information elements are determined.

In particular, when several ground control systems are present, particular request formats are used depending on the systems. For example, in order to communicate with an ATC system, a request Rb may be formulated in the optional data of ADS-C messages, whereas for communicating with an AOC system, an Rb request is formulated according to the predefined free format, for example by using ASN.1 syntax.

In the case when several ground control systems are present, the pieces of information corresponding to the second sub-set of ground information elements are sent to each of the ground control systems.

Alternatively, specific sub-sets of ground information elements are provided for each of the ground control systems, in order to differentiate the needs of an ATC control system and of an AOC control system.

Optionally, the first decision $Db_1$ made by the decision-making module 40 is also sent by the sending module 42.

The onboard system also comprises a receiving module 44, capable of receiving pieces of information $I_{bm}$ corresponding to the Rb request.

The module 44 is capable of optionally receiving a first decision made by a ground control system, noted as Ds1, and one or several Rs requests for requesting useful additional pieces of information for the ground control system(s).

The received pieces of information $I_{bm}$ are recorded and transmitted to the decision-making module 40, which is capable of making a second decision $Db_2$ depending on the totality of the information available onboard, the pieces of information $I_{bp}$ and $I_{bm}$.

Thus, the onboard system is capable of making a second decision depending on the totality of the information listed by the first set $E_i^1$ of information elements, therefore from complete knowledge of the data characterizing situation $S_i$.

Alternatively, the first decision $Db_1$ made by the decision-making module 40 and the first decision made by one or by each ground control system are also taken into account for making a second decision $Db_2$.

According to a first embodiment, the second decision is automatically made by implementing a multi-criteria selection algorithm.

According to a second embodiment, the second decision $Db_2$ is made by a pilot on the basis of a display of the totality of the pieces of information listed by the first set $E_i^1$ relating to the situation Si.

Alternatively, the first and second decisions $Db_1$ and $Db_2$ are also displayed to the pilot for the final decision-making.

The second decision $Db_2$, which is the final decision is sent to the ground control systems by the sending module 42.

Further, the onboard device comprises a module 46 for shaping the set of exchanged data and pieces of information, in a consistent format in order to facilitate their display on the graphic interface of the monitoring screens 8 intended for the members of the crew and the decision-making by the pilot in the presence of the whole of the pieces of information relating to the current situation $S_i$.

The module 46 is capable of recovering pieces of information to be displayed as numerical data of several modules, notably of the module 38 for recovering and analyzing pieces of information recorded onboard, of the decision-making module 40, of the receiving module 44.

The module 38 also processes the Rs requests, and identifies in the set of pieces of information 36 the additional data to be transmitted to the ground in order to reply to the Rs requests. It transmits these data to the sending module 42, which processes them similarly to the data $I_{bs}$.

It should be noted that for situations not requiring fast decision-making, only the modules 30, 38, 42, 44 and 46 are applied.

Figure 4:
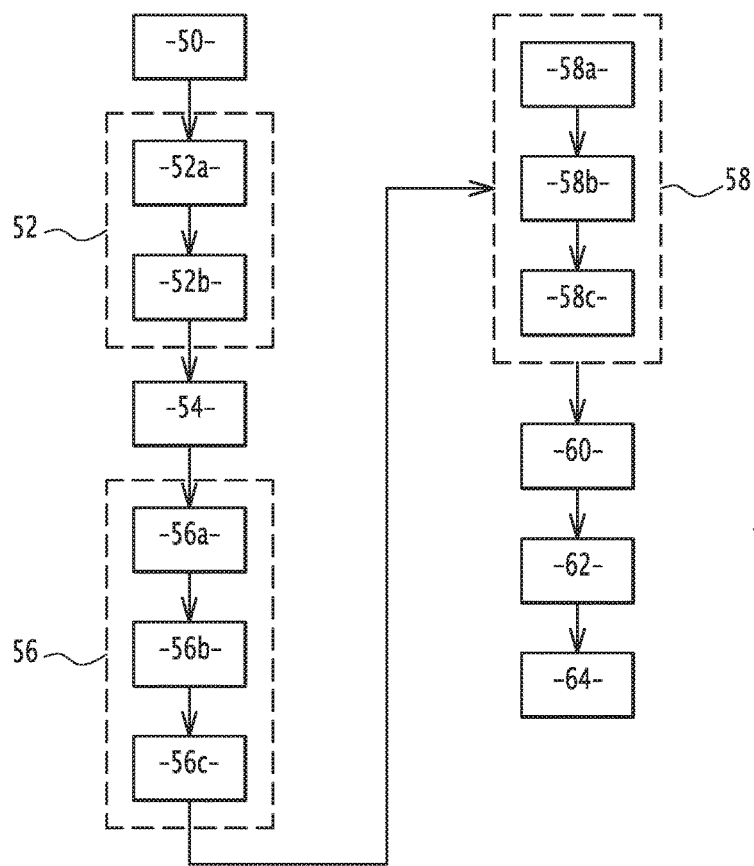
FIG. 4 is a block diagram of the main steps of a method for communicating and sharing of information according to an embodiment of the described technology.

FIG. 4 illustrates the main steps of a method for communicating and sharing onboard-ground pieces of information, according to an embodiment of the described technology, applied by an onboard system 28.

The method comprises a first step 50 for identifying a current situation, from among a set of predetermined situations comprising at least one nominal situation and one critical situation.

The identification of the current situation may be carried out automatically by the onboard system, for example in the case of a detection of an engine failure or of de-pressurization.

Alternatively, it is a pilot which triggers the identification of the situation, for example, by selecting a situation from a list by means of a scrolling menu. According to an embodiment, the pilot selects a critical situation in a menu, subsequently to the received information, for example by audio communication with a ground system.

According to another alternative, or as an addition to the previous alternatives, the pilot has a single capability, for example a button, for triggering a critical situation condition.

Step 50 is followed by a step 52 for recovering and analyzing useful onboard information. This step comprises the recovery of a file of information elements Fi as described above, corresponding to the identified situation $S_i$, as well as of useful onboard pieces of information $I_b$ (the list of the pieces of information making up $I_b$ is included in Fi).

Next, a sub-step 52*a* carries out the analysis of the available pieces of information $I_{bp}$ and the determination, from a first set of information elements $E_i^1$ of the file of information elements Fi and from pieces of information $I_b$, of a set of pieces of information $I_{bm}$ unavailable onboard, which are missing or obsolete pieces of information.

In an embodiment, the onboard system applies a unified display of the available pieces of information $I_{bp}$, in a consistent format, with rapid and intuitive access, allowing the crew members of rapidly and easily accessing the whole of the pieces of information $I_{bp}$ relating to the current situation $S_i$.

During step 52*b*, the pieces of information available onboard and useful for the ground control systems are determined from the whole of the information elements $E_i^2$ of the file of information elements Fi.

Next, a first decision $Db_1$ is elaborated during the step for making a first decision 54, based on the pieces of information $I_{bp}$ available onboard and useful for the identified situation Si. The elaboration of the first decision is either carried out automatically by computation on the basis of the pieces of information $I_{bp}$ relating to the situation $S_i$ recorded onboard, or by obtaining a decision selected by a pilot on the basis of a display of the pieces of information $I_{bp}$ relating to the situation $S_i$ recorded onboard.

In the case when the decision is elaborated automatically, desirably a multi-criteria selection algorithm as detailed above is applied.

Next, a step for sending data 56 carries out the sending from the onboard system to the ground control system(s) of one or several communication messages.

During a sending sub-step 56*a*, one or several Rb requests are formatted according to a predetermined message format, in order to request from the ground control system(s) the sending of missing pieces of information $I_{bm}$ onboard, corresponding to the sub-set of missing information elements determined earlier.

Further, during a sending sub-step 56*b*, the pieces of information $I_{bs}$ present onboard and useful for the ground control systems are sent, in suitable communication messages to the ground control systems.

Advantageously, the awareness situation of the ground is improved with less cognitive cost for the actors, which allows better safety in the case of critical situations $S_i$.

Finally, during an optional sending sub-step 56*c*, the first decision $Db_1$ elaborated in step 54 is also sent in a suitable communication message to the ground control systems.

According to an alternative, the sending of the first decision $Db_1$ elaborated in step 54 is only carried out after validation by a pilot.

The sending of the first decision made onboard gives the possibility to the ground control systems and/or to the operators of these systems of validating or of discarding this first decision, by proposing in turn a decision.

Advantageously, the decision-making is accelerated, which allows better safety in the case of critical situations $S_i$. Further, the sharing of the decisions is promoted, which allows sharing of the visions of critical situations from various actors onboard the aircraft and on the ground.

Subsequently to the sending of the onboard system towards the ground control system(s), communication messages are received onboard from the ground during an onboard receiving step 58.

The receiving step 58 comprises a sub-step 58*a* for receiving one or several communication messages, from the ground control systems, containing the pieces of information $I_{bm}$ required by the sent Rb request(s). Thus, advantageously, the missing pieces of information onboard are automatically received from the ground control systems without requiring input or a specific request from a pilot.

Optionally, the receiving step 58 comprises a sub-step 58*b* for receiving a first decision $Ds_1$ made on the ground, depending on the whole of the pieces of information relating to the situation $S_i$ transmitted to the ground.

According to an embodiment, the making of the first decision $D_{S1}$ is carried out on the ground by applying a multi-criteria selection algorithm depending on the pieces of information $I_{bs}$ received and on other pieces of information present on the ground.

Alternatively, several first ground decisions are received, each stemming from a ground control system, for example an ATC system or an AOC system, these first ground decisions may be different.

In this case, the onboard-ground cooperation is improved.

Finally, the receiving step 58 optionally comprises a sub-step 58*c* for receiving information requests Rs, requesting from the onboard system the sending of useful pieces of information to the ground control systems, which have not been identified beforehand in the sub-set of information elements $E_i^2$. These are onboard pieces of information which have not been transmitted to the ground, which may be used for improving the determination of the situation $S_i$ by the ground control systems.

Each ground control system is capable of sending such Rs requests, depending on its specific needs.

It should be noted that the steps 56 and 58 are repeated automatically, until the required onboard pieces of information have been completely received from the ground on the one hand, and until pieces of information required by the ground control systems have been transmitted from onboard to the ground.

The onboard system applies a step 60 for a unified display of pieces of information, in a consistent format, with rapid and intuitive access, allowing the crew members to become rapidly and easily aware of the whole of the pieces of information relating to the current situation $S_i$.

The onboard system applies a step 62 for making a second decision consisting of elaborating a second onboard decision $Db_2$ depending on the whole of the pieces of information present onboard, including pieces of information received from the ground control systems in response to the Rb request.

According to an embodiment, a multi-criteria selection algorithm is applied, on a set of criteria $\{C_1, \ldots, C_K\}$. The selection of the criteria depends on the situation $S_i$, and the respective values of the criteria are provided by the pieces of information recovered in steps 52 and 58 respectively.

A weighting function or multi-criteria function is established, each criterion $C_j$ having a relative weight $p_j$, notably depending on the type of situation Si.

For example, in the case of searching for diversion airports, criteria $C_j$ are defined, as well as their relevance for the various relevant airports.

According to a first option, coefficients $a_{m,j}$ are defined, each corresponding to a mark given to an airport m with respect to the criterion $C_j$. The value of the coefficient $a_{m,j}$ is zero if the airport m is not at all relevant for the criterion $C_j$.

Exemplary criteria in this case are the following:

$C_1$: time for reaching the airport m, based on the Estimated Time of Arrival (ETA) value: the shorter the time, the greater is the value of the coefficient $a_{m,1}$;

$C_2$: distance between the current position of the airplane and the airport m: the shorter the distance, the greater is the value of the coefficient $a_{m,2}$;

$C_3$: onboard remaining fuel (EFOB), if the airport m cannot be reached with the remaining fuel, $a_{m,3}=0$, otherwise the value of $a_{m,3}$ is maximum. The mark 0 for this criterion is an eliminatory mark, the airport m cannot be retained for the decision;

$C_4$: the elevation along the path, notably the safety altitudes, several values of $a_{m,4}$ are gradually defined;

$C_5$: weather conditions along the path, values of $a_{m,5}$ are gradually defined, and the value of $a_{m,5}$ is greater if the weather conditions are good;

$C_6$: weather conditions at the airport, values of $a_{m,6}$ are gradually defined, and the value of $a_{m,6}$ is greater if the weather conditions are good;

$C_7$: runway length of the airport; if the runway length is less than a given value, $a_{m,7}=0$, otherwise the value of $a_{m,7}$ is maximum;

$C_8$: strength of the runway of the airport; the value of $a_{m,8}$ depends on the strength;

$C_9$: opening hours of the airport, if the ETA is not included in the opening hour interval, $a_{m,9}=0$, otherwise the value of $a_{m,9}$ is maximum;

$C_{10}$: suitability of the airport for emergency landing; $a_{m,10}=0$ if the airport has no capacity for emergency landing, e values of $a_{m,10}$ are gradually defined depending on the capabilities of the airport in terms of emergency landing;

$C_{11}$: availability of visual and non-visual aids (approach beacons, runway lights and runway axis lights, wheel contact area lights, ILS transmitter, etc.). Several values $a_{m,11}$ are gradually defined;

$C_{12}$: The operational minima. The value $a_{m,12}$ depends on the altitude corresponding to the operational minima;

$C_{13}$: Capacity for receiving passengers: the greater the capacity, the greater is the value of the coefficient $a_{m,13}$.

$C_{14}$: Presence of medical capabilities. This criterion will only be taken into account for certain situations (for example,سick person onboard); $a_{m,14}$ has the value 0 if there are no capabilities in the airport or in proximity thereto. Next, several values $a_{m,14}$ may be gradually defined depending on the medical equipment level and on the proximity.

$C_{15}$: Repair capabilities. This criterion will only be taken into account for certain situations (for example failures); $a_{m,15}$ has the value 0 if there are no capabilities in the airport. Next, several values $a_{m,15}$ may be gradually defined depending on the repair capacities.

$C_{16}$: Presence of commercial assistance from the airline. This criterion may only be taken into account for non-critical situations, $a_{m,16}$ has the value 0 if there is no commercial assistance of the airline, otherwise it is maximum.

$C_{17}$: Significant indicator for the company network (depending on the number of services, with the purpose of minimizing delays). This criterion may only be taken into account for non-critical situations.

$C_{18}$: Proximity with respect to the initial destination. This criterion may be taken into account only for non-critical situations. The longer the distance, the lower value of $a_{m,18}$.

A total score is calculated for each airport m, depending on the values of the coefficients and weights relating to the retained criteria, depending on the situation:

$$N_m = \sum_{j=1}^{K} p_j a_{m,j}$$

In the example detailed above, K=18.

The calculated airport scores give the possibility of carrying out a classification of the airports.

The most suitable airport, selected automatically during the decision-making step 62 is the airport which obtains the maximum score from among the M possible airports:

$$r : N_r = \text{Max}(N_1, \ldots, N_M)$$

According to a second option, a classification of the airports is carried out via a multi-criteria function, by using for each criterion $C_j$, an associated utility function $u_j(C_j)$.

Desirably, a utility function $u_j$ is established for each criterion $C_j$, by using the Macbeth method.

Next, a k-additive Choquet integral allows evaluation of an interaction between k criteria. Choquet integrals are sub-additive or super-additive integrals, known and used in the field of multi-criteria decision-making.

Alternatively, a generalized additive independence model, introduced by C. Fishburn in 1967 is applied and also used in the field of multi-criteria decision-making.

Alternatively, any multi-criteria selection algorithm, known in the field of multi-criteria decision-making, may be applied.

The decision-making is either carried out automatically by applying the result of the applied multi-criteria selection algorithm, or by displaying a classification stemming from a multi-criterion selection algorithm to the pilot, which then selects the decision.

For example, in the case of the search for diversion airports:
  If the module 40 does not elaborate the decision, the data useful for each airport and the decisions $Db_1$, $Db_2$ inputted by the pilot and $Ds_1$, $Ds_2$, . . . received from the ground are just displayed;
  If the module 40 elaborates the decision, the multi-criteria selection algorithm calculates and classifies the diversion airports according to their suitability level with respect to the criteria. $Db_1$ or $Db_2$ corresponds to the first classified airport. $Db_1$ is not just displayed; the list of the N first airports is displayed in order. For each airport, the useful data are displayed. $Db_1$, $Db_2$, $Ds_1$, $Ds_2$, . . . are also displayed.

For example, for the search for diversion airports, sharing a synthesis of the classified airports according to a preferred order is contemplated, the first displayed airport corresponding to the automatically calculated decision, with display of the parameters estimated to be keys or critical parameters for the situation $S_i$, for example as a table as shown below (Table 1):

TABLE 1

| Airport | Criterion 1 | Criterion 2 | Criterion 3 | Criterion 4 | Criterion 5 |
|---|---|---|---|---|---|
| Airport 1 (= Db2) | | | | | |
| Airport 2 | | | | | |
| Airport 3 | | | | | |
| Airport 4 | | | | | |

For example, the following criteria are selected for the display, from among the criteria $C_1$ to $C_{18}$ listed above:
  $C_2$: Distance for reaching the airport
  A criterion derived from $C_1$: ETA
  $C_3$: EFOB
  $C_7$: length of the runway
  $C_4$: safety altitudes Next, in order to have the whole of the data on a given airport, the pilot clicks on the relevant airport.

The second decision $Db_2$ elaborated onboard is then transmitted to the ground control systems during a transmission step 64.

According to an alternative, the decision $D_{b2}$ is validated by a pilot before sending it to the ground control systems.

In a scenario for applying the described technology, the identified situation $S_i$ is a failure situation or any other cause which requires diversion, consisting of selecting a diversion airport from among a set of closest airports. This is a critical situation, requiring rapid decision-making.

In this case, the decision to be made, in cooperation between the onboard system and the control systems on the ground, is the selection of the diversion airport.

In any situation requiring diversion, the pieces of information useful onboard, to be recovered from the ground control systems, for each of the candidate airports, include:
  information relating to weather conditions,
  time for reaching the airport,
  information relating to the elevations and altitudes,
  availability of the ground infrastructures,
  NOTAMS,
  dimensions and characteristics of the runways,
  type and trajectory of the available approaches,
  operational minima,
  technical/medical/commercial treatment capacity.

For the ground control systems (ATC or AOC), the useful pieces of information, in a situation when diversion is required for the aircraft, comprise:
  the reason of the diversion,
  the weather conditions in proximity to the airplane,
  the type and series number of the airplane,
  flight number,
  number of persons onboard,
  information related to the condition of the airplane,
  remaining autonomy,
  airport retained for diversion, estimated time of arrival (ETA).

In a nominal situation, the method of the described technology may be used for regularly recovering, at least one sub-set of pieces of information of each of the close airports, foreseeing a possible diversion, in order to have a maximum of information recorded onboard and available.

According to another embodiment, a change in situation stems from the ground control systems. In this embodiment, one of the ground control systems or both, each implement a system similar to the system 28 described with reference to FIG. 2 and implementing the steps 50 to 64 described above, in which exchanges are made between the first system which is then the ground control system and the second system which is the onboard system loaded into the aircraft.

This is the ground control system which applies steps:
  for identifying a situation from among a set of predetermined situations comprising at least one nominal situation and a critical situation,
  obtaining from a data structure recorded beforehand associated with the identified situation, a first set of information elements useful for the ground control system,
  determining, from the first set of information elements, and from information recorded beforehand, a set of unavailable pieces of information,
  establishing at least one first request to be sent from the ground control system to the onboard system in order to request information of the determined set of unavailable pieces of information,
  sending at least the first request from the ground control system to the onboard system.

In addition to the communication and the sharing of information, the method and the system of the described technology give the possibility of assisting the decision of a pilot and/or of an air controller, in a degraded or critical situation of an aircraft.

As regards the piloting of the aircraft, desirably the final decision is made by the pilot of the aircraft, with the aid of the computed onboard decisions, and as an option of the decision(s) calculated on the ground.

As can be appreciated by one of ordinary skill in the art, each of the modules or software of the program(s) can include various sub-routines, procedures, definitional statements, and macros. Each of the modules are typically separately compiled and linked into a single executable program. Therefore, any description of modules or software is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method of communicating and sharing information between an onboard system loaded onboard an aircraft and at least one ground control system, the method comprising:
    identifying a situation from among a set of predetermined situations comprising at least one nominal situation and a critical situation;
    obtaining, from a data structure recorded beforehand associated with the identified situation, a first set of information elements usable by a first system from among the onboard system and a ground control system;
    determining, from the first set of information elements, and from pieces of information recorded beforehand, a set of pieces of information unavailable in the first system;
    establishing at least one first request to be sent from the first system to at least one second system, the at least one second system being different from the first system and selected from among the onboard system and a ground control system, to request information of the set of pieces of information unavailable in the first system;
    sending the at least one first request from the first system to the at least one second system; and
    receiving a second system first decision associated with the identified situation made in the at least one second system, taking into account the information available in the first system and transmitted to the at least one second system.

2. The method according to claim 1, further comprising:
    obtaining from the data structure associated with the identified situation, a second set of useful information elements for the at least one second system;
    determining pieces of information available in the first system corresponding to the second set of information elements; and
    sending the determined pieces of information to the at least one second system.

3. The method according to claim 1, further comprising elaborating in the first system, a first system first decision associated with the identified situation from the pre-recorded pieces of information.

4. The method according to claim 3, further comprising sending, from the first system to at least one second system, the first system first decision elaborated in the first system.

5. The method according to claim 4, wherein the second system first decision made in the at least one second system further takes into account the first system first decision elaborated in the first system.

6. The method according to claim 4, further comprising elaborating in the first system a second decision associated with the identified situation from the totality of the pieces of information recorded and received in the first system.

7. The method according to claim 6, wherein the elaborating of the second decision uses the first system first decision elaborated in the first system.

8. The method according to claim 6, wherein the elaborating of the first system first decision and the second decision apply a multi-criteria selection algorithm.

9. The method according to claim 8, further comprising performing: i) a validation by a pilot or a controller of the second decision and ii) a transmission of the second decision from the first system to the at least one second system.

10. The method according to claim 1, comprising receiving one or several communication messages, from the at least one second system, containing pieces of information unavailable in the first system required in the first request.

11. The method according to claim 1, further comprising:
    receiving at least one second request for information from the at least one second system; and
    sending, from the first system to the at least one second system, information required in the second request.

12. The method according to claim 1, wherein the first system is the onboard system loaded onboard the aircraft.

13. The method according to claim 12, wherein one of the at least one second system is a ground air traffic control system.

14. The method according to claims 12, wherein one of the at least one second system is a ground operation control system.

15. The method according to claim 1, wherein the first system is a ground control system from among a ground air traffic control system and a ground operation control system, and the at least one second system is the onboard system loaded onboard the aircraft.

16. A system for communicating and sharing information between an onboard system loaded onboard an aircraft and at least one ground control system, the system comprising:
    a memory having instructions stored thereon; and
    a processor circuit, the instructions, when executed, causing the processor circuit to:
        identify a situation from among a set of predetermined situations comprising at least one nominal situation and one critical situation,
        obtain, from a data structure recorded beforehand, associated with the identified situation, a first set of information elements usable by a first system from among the onboard system and a ground control system, determine, from the first set of information elements, and from pieces of information recorded beforehand, a set of pieces of information unavailable in the first system, establish at least one first request to be sent from the first system to at least one second system, the at least one second system being different from the first system and selected from among the onboard system and a ground control system, to request information from the set of pieces of information unavailable in the first system, send the at least one first request from the first system to the at least one second system, and receive a second system first decision associated with the identified situation, made in the at least one second system, taking into account information available in the first system and transmitted to the at least one second system.

17. The system according to claim 16, wherein the first system is the onboard system loaded onboard the aircraft and wherein the at least one second system is a ground air traffic control system or a ground operation control system.

18. The system according to claim 16, wherein the first system is a ground control system from among a ground air traffic control system and a ground operation control system, and wherein the at least one second system is the onboard system loaded onboard the aircraft.

19. A non-transitory computer readable medium comprising instructions that, when executed, cause at least one processor circuit to:

identify a situation from among a set of predetermined situations comprising at least one nominal situation and one critical situation;

obtain from a data structure recorded beforehand associated with the identified situation, a first set of information elements usable by a first system from among the onboard system and a ground control system;

determine, from the first set of information elements, and from pieces of information recorded beforehand, a set of pieces of information unavailable in the first system;

establish at least one first request to be sent from the first system to at least one second system, the at least one second system being different from the first system and selected from among the onboard system and a ground control system, to request information from the set of pieces of information unavailable in the first system;

send the at least one first request from the first system to the at least one second system; and receive a second system first decision associated with the identified situation, made in the at least one second system, taking into account information available in the first system and transmitted to the at least one second system.

* * * * *